United States Patent
Park (10) Patent No.: US 9,367,969 B2
(45) Date of Patent: Jun. 14, 2016

(54) SYSTEM AND METHOD OF INTERLOCKING VEHICLE TERMINAL WITH PORTABLE TERMINAL

(71) Applicant: Hyundai Motor Company, Seoul (KR)

(72) Inventor: Sung Woo Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 53 days.

(21) Appl. No.: 14/324,961

(22) Filed: Jul. 7, 2014

(65) Prior Publication Data

US 2015/0187145 A1 Jul. 2, 2015

(30) Foreign Application Priority Data

Dec. 30, 2013 (KR) ........................ 10-2013-0167823

(51) Int. Cl.
*G07C 5/00* (2006.01)
*H04L 29/08* (2006.01)
*G07C 5/08* (2006.01)

(52) U.S. Cl.
CPC ................ *G07C 5/008* (2013.01); *G07C 5/085* (2013.01); *H04L 67/12* (2013.01); *H04L 67/34* (2013.01); *G07C 2205/02* (2013.01)

(58) Field of Classification Search
CPC .... G07C 5/008; G07C 5/085; G07C 2205/02; H04L 67/12; H04L 67/34
USPC ........................................................ 701/31.5
See application file for complete search history.

(56) References Cited

U.S. PATENT DOCUMENTS

| 2004/0227523 | A1 | 11/2004 | Namaky |
| 2006/0212527 | A1* | 9/2006 | Tonegawa ............... H04L 51/30 709/206 |
| 2007/0245344 | A1* | 10/2007 | Kumagai .................. G06F 8/65 717/174 |
| 2009/0049442 | A1* | 2/2009 | Shimasaki ............... G06F 8/61 717/174 |
| 2009/0077240 | A1 | 3/2009 | Alrabady et al. |
| 2009/0276115 | A1 | 11/2009 | Chen |
| 2010/0325629 | A1* | 12/2010 | Fujioka ................. G06F 3/0481 718/1 |

(Continued)

FOREIGN PATENT DOCUMENTS

| EP | 2736225 A1 | 5/2014 |
| KR | 10-0574538 | 4/2006 |

(Continued)

OTHER PUBLICATIONS

European Search Report dated Jun. 10, 2015 issued in European Patent Application No. 14169808.4.

*Primary Examiner* — Jerrah Edwards
*Assistant Examiner* — Frederick Brushaber
(74) *Attorney, Agent, or Firm* — McDermott Will & Emery LLP (57) ABSTRACT

A system for interlocking a vehicle terminal with a portable terminal includes the vehicle terminal configured to correct vehicle data including mileage, self-diagnosis information, and driving information according to an operation. The portable terminal is physically connected with the vehicle terminal and connected with a service server of a control center through wireless communication. The portable terminal is configured to transmit the vehicle data provided from the vehicle terminal to the service server and receive information and a management service provided from the service server. The portable terminal is provided the information and the management service to the vehicle terminal.

8 Claims, 6 Drawing Sheets

(56) References Cited

U.S. PATENT DOCUMENTS

| | | | |
|---|---|---|---|
| 2011/0107349 A1* | 5/2011 | Kishita | G06F 9/44 719/313 |
| 2011/0238255 A1* | 9/2011 | Sano | B60R 16/0232 701/31.4 |
| 2011/0258301 A1* | 10/2011 | McCormick | H04L 67/34 709/222 |
| 2012/0054179 A1* | 3/2012 | Zhu | H04N 21/4722 707/723 |
| 2012/0233031 A1* | 9/2012 | Chang | G06F 17/30017 705/27.1 |
| 2013/0103951 A1* | 4/2013 | Klevan | H04L 9/3231 713/186 |
| 2013/0144974 A1* | 6/2013 | Haakenson | H04L 67/26 709/217 |
| 2013/0304278 A1 | 11/2013 | Chen | |
| 2014/0032759 A1* | 1/2014 | Barton | H04L 67/10 709/225 |
| 2014/0040979 A1* | 2/2014 | Barton | H04L 63/20 726/1 |

FOREIGN PATENT DOCUMENTS

| | | |
|---|---|---|
| KR | 10-2011-0071596 A | 6/2011 |
| KR | 10-2012-0039894 A | 4/2012 |
| KR | 10-2013-0012231 A | 2/2013 |
| KR | 10-2013-0034892 A | 4/2013 |
| WO | 2013/015054 A1 | 1/2013 |

* cited by examiner

SYSTEM AND METHOD OF INTERLOCKING VEHICLE TERMINAL WITH PORTABLE TERMINAL

CROSS-REFERENCE TO RELATED APPLICATION

This application claims the benefit of priority to Korean Patent Application No. 10-2013-0167823 filed in the Korean Intellectual Property Office on Dec. 30, 2013, the entire contents of which are incorporated herein by reference.

TECHNICAL FIELD

The present disclosure relates to a system and a method of interlocking a vehicle terminal with a portable terminal, and more particularly, to a system and a method of interlocking a vehicle terminal with a portable terminal, which automatically confirm whether an interlocking application (APP) is installed when the vehicle terminal is connected with the portable terminal, and automatically install the interlocking APP or automatically execute the installed interlocking APP, to provide an automatic access to a service server.

BACKGROUND

A vehicle implements a high-tech science mechanism in which various electronic control devices are mechanically combined. The electronic control devices receive general state information about the vehicle from sensors installed in respective parts of the vehicle and more efficiently controls the respective parts of the vehicle based on the received state information. The high-tech science mechanism provides stable drivability and improved fuel efficiency, and pleasant and comfortable ride.

Further, the vehicle includes a self-diagnosis unit for generating and storing a diagnosis code in a case where a failure is detected by detecting a control signal output from the electronic control devices and an operation result according to the control signal. Accordingly, when a driver determines that he or she needs to visit a service center for a problem with a vehicle, the service center precisely diagnoses whether the vehicle has the problem by using a scanner and replaces components and repairs the vehicle according to a diagnosis result.

As described above, in order to confirm the presence of the problem with the vehicle, the driver needs to visit the service center, and as a result, when the driver continuously and unreasonably drives the vehicle without recognizing the problem, the vehicle may get a more severe problem.

A vehicle terminal including an audio and video (AV) function of reproducing AV signals stored in various medium and a navigation function of guiding a path for a destination and providing traffic information about a travelling road is installed in the vehicle.

The vehicle terminal uses telematics, which is a combination of telecommunication and information, enabling the vehicle terminal to access a control center providing a management service through wireless communication and to receive various information and the management service provided from the control center. The vehicle terminal transmits vehicle data including mileage, self-diagnosis information, driving information, and the like to a service server installed in an external control center, and receives various information and management services provided from the service server. The vehicle terminal requires a communication modem in order to access the service server installed in the control center through wireless communication, so that the vehicle can use a portable terminal of the driver as the communication modem.

For example, when the vehicle terminal is connected with the portable terminal of the driver by a USB terminal, and then the vehicle data including the mileage, the self-diagnosis information, the driving information, and the like is transmitted to an APP of the portable terminal, the APP of the portable terminal displays the vehicle data received from the vehicle terminal through the APP in a predetermined form, and accesses the service server installed in the external control center and transmits the vehicle data.

The portable terminal receives the management service provided from the service server installed in the control center and provides the received management service to the vehicle terminal, thereby enabling the management service according to an operation of the vehicle to be executed. Further, the vehicle terminal is connected with the portable terminal of the driver through Bluetooth, thereby providing a call in the control center.

As described above, for the interlocking between the vehicle terminal and the portable terminal, the APP providing the interlocking between the portable terminal and the vehicle terminal needs to be installed. Accordingly, in order to install the interlocking APP in the portable terminal, the driver, who is a user of the portable terminal, inconveniently accesses the APP Store or the Android Market, and then manually searches for an APP interlocking with the vehicle terminal among various APPs and installs the searched APP.

When accessing the service server of the control center, an interlocking service is provided only when the driver inconveniently directly selects the interlocking APP installed in the portable terminal after connecting the vehicle terminal and the portable terminal through a USB cable, and executes the interlocking APP. Further, in order to delete the APP which is installed in the portable terminal and affects the driving regulations or a specific APP which needs to be deleted for an update of the interlocking APP, the user needs to manually enter an APP deletion mode, search and delete the corresponding APP.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides automatic access to a service server by automatically confirming whether an interlocking application (APP) is installed when a vehicle terminal is connected with a portable terminal, and automatically installing the interlocking APP or automatically executing an installed interlocking APP.

Further, the present disclosure automatically searches for an APP that affects the driving regulations or an unnecessary specific APP when a vehicle terminal is connected with a portable terminal, and automatically deleting the searched specific APP.

According to an exemplary embodiment of the present disclosure, a system for interlocking a vehicle terminal with a portable terminal includes the vehicle terminal configured to correct vehicle data including mileage, self-diagnosis information, and driving information according to an operation. A portable terminal is physically connected with the vehicle terminal, and connected with a service server of a control center through wireless communication, and configured to transmit the vehicle data provided from the vehicle terminal to the service server, receive information and a management service provided from the service server, and provide the received information and the management service to the vehicle terminal.

The physical connection between the vehicle terminal and the portable terminal may adopt any one among communication through a USB cable, Bluetooth communication, RF communication, WiFi communication, ZigBee communication, and NFC communication.

The vehicle terminal may further include an APP installation confirming module configured to confirm whether an interlocking APP interlockable with the vehicle terminal is installed in the portable terminal. An interlocking APP installation inducing module is configured to make a request for installing the interlocking APP in the portable terminal when the interlocking APP is not installed in the portable terminal as a result of the confirmation of the APP installation confirming module. An interlocking APP execution inducing module is configured to make a request for executing the interlocking APP in the portable terminal when the interlocking APP is installed in the portable terminal as the result of the confirmation of the APP installation confirming module. An interlocking APP deletion inducing module is configured to make a request for deleting the interlocking APP and a specific APP, which are installed in the portable terminal.

The APP installation confirming module may transmit a request signal for confirming whether the interlocking APP is installed in the portable terminal, and confirm whether the interlocking APP is installed from a signal replied from the portable terminal.

The interlocking APP deletion inducing module may make a request for automatically deleting an APP that affects the driving regulations, a specific APP that needs to be deleted for update, and a specific APP that conflicts with the interlocking with the vehicle terminal, which are installed in the portable terminal.

The portable terminal may include an interlocking APP installation determining module configured to confirm whether the interlocking APP is installed in an OS terminal according to a request of the vehicle terminal; an interlocking APP installation replying module configured to transmit information about whether the interlocking APP is installed, which is confirmed by the interlocking APP installation determining module, to the vehicle terminal; an interlocking APP automatic installing module configured to search for and automatically install the interlocking APP corresponding to the vehicle terminal by interworking with an APP store connecting module according to an interlocking APP installation request of the vehicle terminal. An interlocking APP automatic execution inducing module is configured to automatically execute an interlocking APP according to an interlocking APP execution request of the vehicle terminal; an interlocking APP automatic deleting module configured to automatically delete the installed APP according to an interlocking APP deletion request of the vehicle terminal. The APP store connecting module is configured to interlock with the interlocking APP automatic installing module, automatically access the APP Store or the Android Market, and search for and install the interlocking APP. A display module is configured to output an installation progress state of the interlocking APP, and an execution screen image of the interlocking APP. An interlocking APP is downloaded from the APP Store or the Android Market and installed and configured to provide interlocking and data communication with the vehicle terminal.

The interlocking APP deleting module may automatically delete an APP that affects the driving regulations, a specific APP that needs to be deleted for update, and a specific APP that conflicts with the interlocking with the vehicle terminal.

According to another exemplary embodiment of the present disclosure, a system for interlocking a vehicle terminal with a portable terminal includes a vehicle terminal configured to collect vehicle data; and a portable terminal physically connected with the vehicle terminal and configured to serve as a communication modem, in which the vehicle terminal includes: an APP installation confirming module configured to confirm whether an interlocking APP is installed in the portable terminal. An interlocking APP installation inducing module is configured to make a request for automatically installing the interlocking APP in the portable terminal. An interlocking APP execution inducing module is configured to make a request for automatically executing the interlocking APP in the portable terminal. An interlocking APP deletion inducing module is configured to make a request for deleting the interlocking APP and a specific APP, which are installed in the portable terminal. The portable terminal includes an interlocking APP installation determining module configured to confirm whether the interlocking APP is installed in an OS terminal according to a request of the vehicle terminal. An interlocking APP installation replying module is configured to transmit a result of the confirmation as to whether the interlocking APP is installed to the vehicle terminal. An interlocking APP automatic installing module is configured to automatically install the interlocking APP corresponding to the vehicle terminal by interworking with an APP store connecting module according to a request of the vehicle terminal. An interlocking APP automatic execution inducing module is configured to automatically execute the interlocking APP according to a request of the vehicle terminal. An interlocking APP automatic deleting module is configured to automatically delete the installed interlocking APP and a specific APP according to a request of the vehicle terminal. An APP store connecting module is configured to search for and install the interlocking APP by automatically accessing an APP store or an Android Market. A display module is configured to output an installation progress state of the interlocking APP, and an execution screen image of the interlocking APP. The interlocking APP is installed by the interlocking APP automatic installing module and configured to provide interlocking and data communication with the vehicle terminal.

According to another exemplary embodiment of the present disclosure, a method of interlocking a vehicle terminal with a portable terminal includes determining, by an operation processor of the vehicle terminal, whether a physical connection of the portable terminal is detected. An APP installation confirming module is activated by an operation processor of the vehicle terminal when the physical connection of the portable terminal is detected, and it is confirmed whether an interlocking APP is installed in the portable terminal. An interlocking APP installation inducing module is activated by an operation processor of the vehicle terminal when the interlocking APP is not installed in the portable terminal, and automatic installation of the interlocking APP is induced.

The operation processor of the vehicle terminal may activate an interlocking APP execution inducing module when the interlocking APP is installed in the portable terminal, and induce automatic execution of the interlocking APP.

The operation processor of the vehicle terminal may activate an interlocking APP deletion inducing module when the portable terminal is physically connected, and induce automatic deletion of an APP that affects the driving regulations, a specific APP that needs to be deleted for update, and a specific APP that conflicts with the interlocking with the vehicle terminal.

According to another exemplary embodiment of the present disclosure, a method of interlocking a vehicle terminal with a portable terminal includes determining, by an operation processor of the portable terminal, whether the vehicle terminal is physically connected. An interlocking APP installation determining module is activated by the operation processor of the portable terminal according to a request of the vehicle terminal when the physical connection of the vehicle terminal is detected, confirming whether an interlocking APP installation determining module is installed in an OS terminal. An interlocking APP installation replying module is activated, and a result of the confirmation is transmitted as to whether the interlocking APP is installed to the vehicle terminal. An interlocking APP automatic installing module and an APP store connecting module are activated by the operation processor of the portable terminal when installation of the interlocking APP is requested from the vehicle terminal, the interlocking APP corresponding to the vehicle terminal in the APP Store or the Android Market is searched, and the searched interlocking APP is automatically installed An interlocking APP automatic execution inducing module is activated by the operation processor of the portable terminal when the interlocking APP is completely installed, the interlocking APP is automatically installed, and a service server is accessed through the interlocking APP.

The operation processor of the portable terminal may activate the interlocking APP automatic execution inducing module according to a request of the vehicle terminal, automatically execute the interlocking APP, and access the service server through the interlocking APP.

The operation processor of the portable terminal may activate an interlocking APP automatic deleting module according to a request of the vehicle terminal, and automatically delete a designated interlocking APP, an APP that affects the driving regulations, a specific APP that needs to be deleted for update, and a specific APP that conflicts with the interlocking with the vehicle terminal.

According to another exemplary embodiment of the present disclosure, a method of interlocking a vehicle terminal with a portable terminal includes activating, by an operation processor of the vehicle terminal, an APP installation confirming module when a physical connection of the portable terminal is detected, and making a request for confirming whether an interlocking APP is installed in the portable terminal. An interlocking APP installation determining module is activated by the operation processor of the portable terminal according to the request of the confirmation from the vehicle terminal, confirming whether the interlocking APP is installed in an OS terminal. An interlocking APP installation replying module is activated, and a result of the confirmation is transmitted as to whether the interlocking APP is installed to the vehicle terminal. An interlocking APP installation inducing module is activated by the operation processor of the vehicle terminal when the interlocking APP is not installed in the portable terminal, and a request for automatically installing the interlocking APP in the portable terminal is made. An interlocking APP automatic installing module and an APP store connecting module are activated by the operation processor of the portable terminal according to the request of the vehicle terminal, the interlocking APP corresponding to the vehicle terminal in the APP Store or the Android Market are searched, and the searched interlocking APP is automatically installed An interlocking APP execution inducing module is activated by the operation processor of the vehicle terminal when the interlocking APP is installed in the portable terminal, and a request for automatically installing the interlocking APP in the portable terminal is made. An interlocking APP automatic execution inducing module is activated by the operation processor of the portable terminal according to the request of the vehicle terminal, the interlocking APP is automatically executed, a service server is accessed through the interlocking APP, and data communication is provided.

The method may further include activating, by the operation processor of the vehicle terminal, an interlocking APP deletion inducing module when the portable terminal is physically connected, and making a request for deleting the APP in the portable terminal. The interlocking APP automatic deleting module is activated by the operation processor of the portable terminal according to a request of the vehicle terminal, and a designated interlocking APP, an APP that affects the driving regulations, a specific APP that needs to be deleted for update, and a specific APP that conflicts with the interlocking with the vehicle terminal are automatically deleted.

According to the exemplary embodiments of the present disclosure, when the vehicle terminal is connected with the portable terminal, whether an interlocking APP is installed is automatically confirmed, so that the interlocking APP is automatically installed, thereby providing a uses with convenience and safety.

Further, according to the exemplary embodiments of the present disclosure, when the vehicle terminal is connected with the portable terminal, the interlocking APP is automatically executed to provide automatic access to a service server, thereby conveniently operating a service.

Further, according to the exemplary embodiments of the present disclosure, when the vehicle terminal is connected with the portable terminal, an APP that affects the driving regulations or an unnecessary specific APP is searched and deleted, thereby conveniently and safely deleting the APP.

DETAILED DESCRIPTION OF THE EMBODIMENTS

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. In addition, each configuration illustrated in the drawings is arbitrarily shown for convenience of a description, but the present disclosure is not limited thereto.

Figure 1:
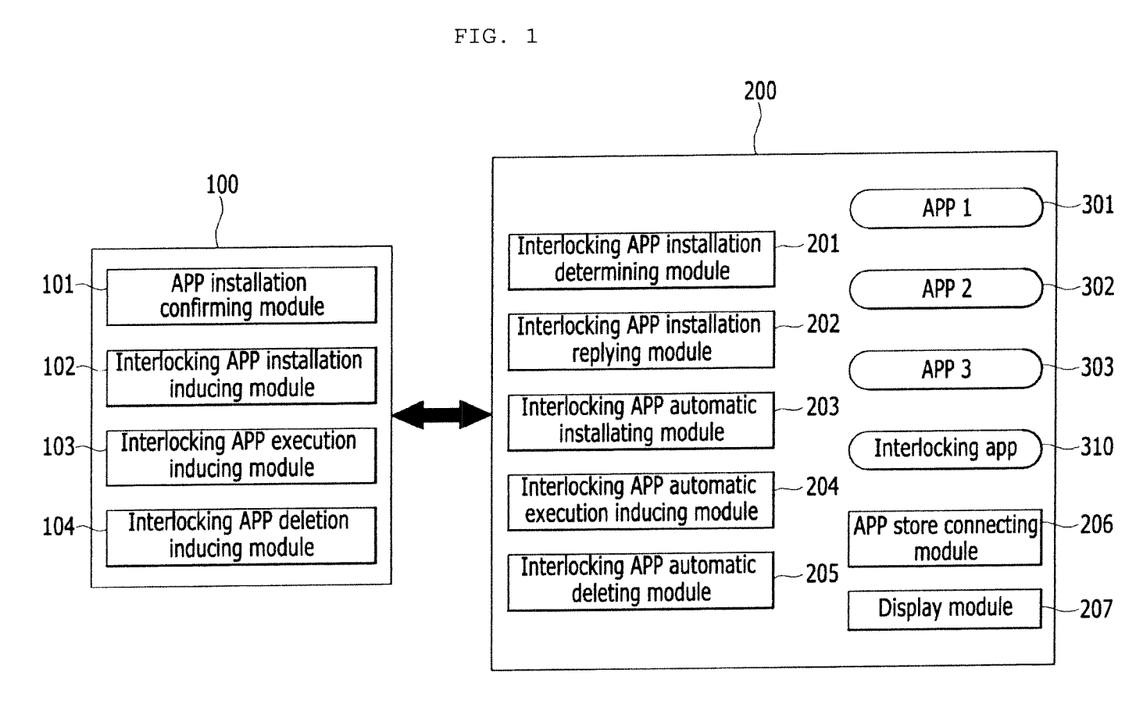
FIG. 1 is a diagram illustrating a connection between a vehicle terminal and a portable terminal according to an exemplary embodiment of the present disclosure.

FIG. 1 is a diagram illustrating a connection between a vehicle terminal and a portable terminal according to an exemplary embodiment of the present disclosure. Referring to FIG. 1, the present disclosure includes a vehicle terminal 100 collecting vehicle data including mileage, self diagnosis information, driving information according to an operation, and the like. A portable terminal 200 is physically connected with the vehicle terminal 100 for data communication, is used as a communication modem, and transmits the vehicle data including the mileage, the self diagnosis information, the driving information, and the like, which are provided from the vehicle terminal 100, to a service server installed in an external control center, receives various information and management services provided from the service server installed in the control center, and provides the received information and management services to the vehicle terminal 100.

The physical connection between the vehicle terminal 100 and the portable terminal 200 may adopt any one communication among a wired connection through a USB cable, Bluetooth communication, RF communication, WiFi communication, ZigBee communication, and NFC communication.

The vehicle terminal 100 includes an APP installation confirming module 101, an interlocking APP installation inducing module 102, an interlocking APP execution inducing module 103, and an interlocking APP deletion inducing module 104. The APP installation confirming module 101 outputs and transmits, to the portable terminal, a request signal for confirming whether an interlocking APP 310, which is capable of communicating (interlockable) with the vehicle terminal 100, is installed in the portable terminal 200 physically connected for data communication, and receives a reply signal as to whether the interlocking APP 310 is installed, which is transmitted from the portable terminal 200.

When the interlocking APP 310, which is capable of communicating (interlockable) with the vehicle terminal 100, is not installed in the portable terminal 200 physically connected for data communication according to the information provided from the APP installation confirming module 101, the interlocking APP installation inducing module 102 outputs a signal for requesting an installation of the interlocking APP 310 and transmits the output signal to the portable terminal 200.

When the interlocking APP 310, which is capable of communicating (interlockable) with the vehicle terminal 100, is installed in the portable terminal 200 physically connected for data communication according to the information provided from the APP installation confirming module 101, the interlocking APP execution inducing module 103 outputs a signal for requesting an execution of the interlocking APP 310 and transmits the output signal to the portable terminal 200.

The interlocking APP deletion inducing module 104 receives information about whether the interlocking APP 310, which is capable of communicating with the vehicle terminal 100, is installed in the portable terminal 200 physically connected for data communication, from the APP installation confirming module 101, outputs a signal for requesting an automatic deletion of the interlocking APP 310, and transmits the output signal to the portable terminal 200. The interlocking APP deletion inducing module 104 outputs a signal for requesting an automatic deletion of an APP that affects the driving regulations, a specific APP that needs to be deleted for update, and a specific APP that conflicts with the interlocking with the vehicle terminal 100, which are installed in the portable terminal 200 physically connected for data communication, and transmits the output signal to the portable terminal 200.

The portable terminal 200, which is physically connected for data communication to serve as a communication modem, includes an interlocking APP installation determining module 201, an interlocking APP installation replying module 202, an interlocking APP automatic installing module 203, an interlocking APP automatic execution inducing module 204, an interlocking APP automatic deleting module 205, the interlocking APP 310, an APP store connecting module 206, and a display module 207.

The interlocking APP installation determining module 201 confirms whether the interlocking APP 310 is installed in an operation system (OS) terminal according to a request for confirming whether the interlocking APP 310 is installed from the vehicle terminal 100 physically connected for data communication, and provides the interlocking APP installation replying module 202 with a result of the confirmation.

The APP installation replying module 202 provides the vehicle terminal 100 with the result of the confirmation as to whether the interlocking APP 310 is installed in the OS terminal.

The interlocking APP automatic installing module 203 interlocks with the APP store connecting module 205 through an operation processor according to a request for installing the interlocking APP 310 from the vehicle terminal 100 physically connected for data communication, accesses the APP Store or the Android Market through the APP store connecting module 205, and searches for and automatically installs the interlocking APP 310 corresponding to the vehicle terminal 100.

The interlocking APP automatic execution inducing module 204 automatically executes the installed interlocking APP 310 through the operation processor according to a request for automatically executing the interlocking APP 310 from the vehicle terminal 100 physically connected for data communication.

The interlocking APP automatic deleting module 205 receives a request for deleting the interlocking APP 310 from the vehicle terminal 100 physically connected for data communication, transmits information about the interlocking APP 310 to be deleted to the operation process, and induces the appropriate APP to be deleted.

The interlocking APP automatic deleting module 205 induces an APP, which affects the driving regulations or needs to be deleted for update, and a specific APP causing a collision to interlocking with the vehicle terminal 100 to be automatically deleted.

The APP store connecting module 206 automatically accesses the APP Store or the Android Market to search for and install the interlocking APP 310.

The APP store connecting module 206 automatically accesses the APP Store or the Android Market to install a specific APP selected by a user among various APPs.

The display module 207 outputs an installation progress state of the interlocking APP 310 and an execution screen image of the interlocking APP 310 in a predetermined form.

The interlocking APP 310 is a specialized APP for a smart phone providing interlocking and data communication with the vehicle terminal 100 physically connected for data communication, and is a software module downloaded from the APP Store or the Android Market and installed in accordance with the operation process.

An operation of the present disclosure including the aforementioned functions will be described below.

Figure 2:
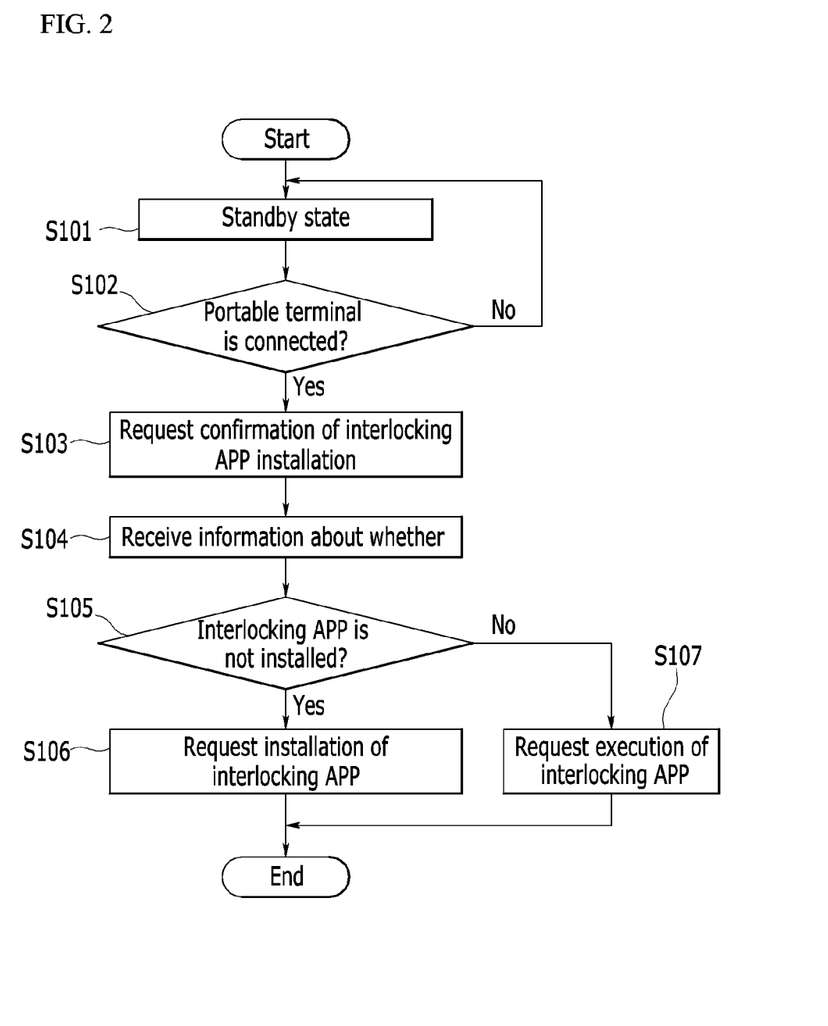
FIG. 2 is a flowchart illustrating an operation procedure of a vehicle terminal connected with a portable terminal according to a first exemplary embodiment of the present disclosure.

FIG. 2 is a flowchart illustrating an operation procedure of a vehicle terminal connected with a portable terminal according to a first exemplary embodiment of the present disclosure In a standby state (S101), the operation processor of the vehicle terminal 100, to which the present disclosure is applied, determines whether the portable terminal 200 is physically connected for data communication (S102).

The physical connection between the vehicle terminal 100 and the portable terminal 200 may adopt any one communication among a wired connection through a USB cable, Bluetooth communication, RF communication, WiFi communication, ZigBee communication, and NFC communication.

When the operation processor of the vehicle terminal 100 determines that the portable terminal 200 is physically connected in step S102, the operation processor of the vehicle terminal 100 activates the APP installation confirming module 101 and makes a request for confirming whether the interlocking APP 310 is installed in the portable terminal 200 (S103).

The operation processor of the vehicle terminal 100 receives information about whether the interlocking APP 310 is installed, which is provided from the portable terminal 200 within a set period of time (S104).

The APP installation confirming module 101 within the vehicle terminal 100 analyzes the information as to whether the interlocking APP 310 is installed, which is received from the portable terminal 200, and determines whether the interlocking APP 310 is installed in the portable terminal 200 (S105).

When the operation processor of the vehicle terminal 100 confirms that the interlocking APP 310 is not installed in the portable terminal 200 through the APP installation confirming module 101 in step S105, the operation processor of the vehicle terminal 100 activates the interlocking APP installation inducing module 102 and makes a request for installing the interlocking APP 310 in the portable terminal 200 (S106).

Accordingly, the interlocking APP 310 interlockable with the vehicle terminal 100 is downloaded from the APP Store or the Android Market and installed in the portable terminal 200.

When the operation processor of the vehicle terminal 100 confirms that the interlocking APP 310 is installed in the portable terminal 200 through the APP installation confirming module 101 in step S105, the operation processor of the vehicle terminal 100 activates the interlocking APP execution inducing module 103 and makes a request for executing the interlocking APP 310 in the portable terminal 200 (S106). Accordingly, the interlocking APP 310 installed in the portable terminal 200 may be executed and activated.

Figure 3:
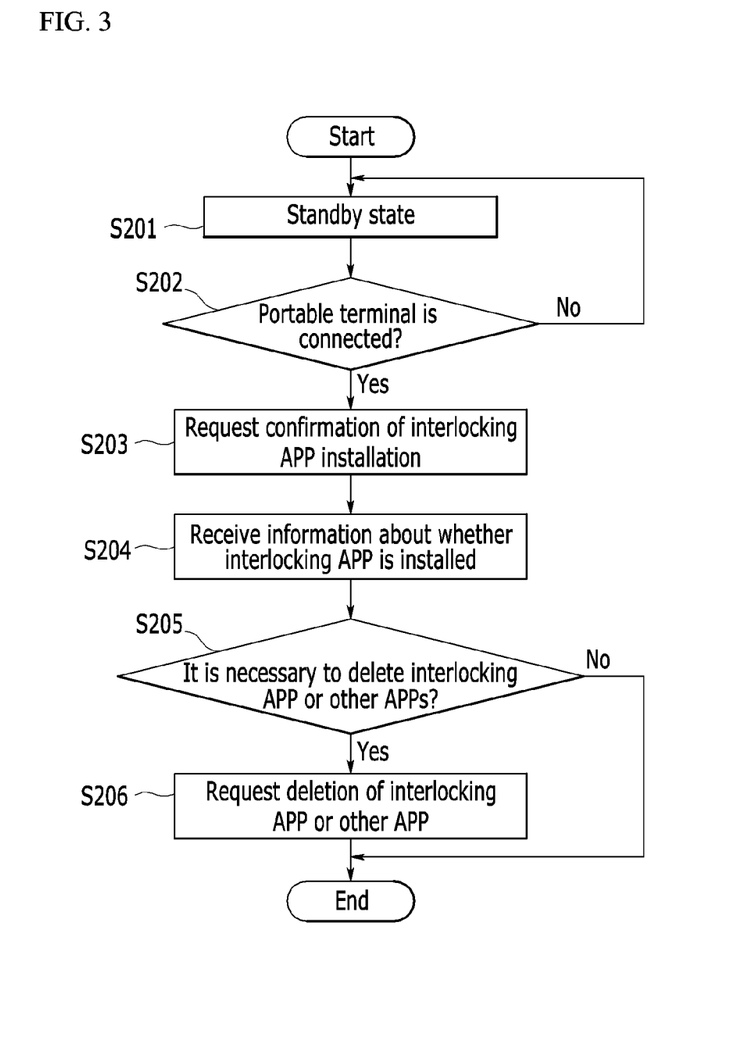
FIG. 3 is a flowchart illustrating an operation procedure of a vehicle terminal connected with a portable terminal according to a second exemplary embodiment of the present disclosure.

FIG. 3 is a flowchart illustrating an operation procedure of a vehicle terminal connected with a portable terminal according to a second exemplary embodiment of the present disclosure.

In a standby state (S201), the operation processor of the vehicle terminal 100, to which the present disclosure is applied, determines whether the portable terminal 200 is physically connected for data communication (S202).

The physical connection between the vehicle terminal 100 and the portable terminal 200 may adopt any one communication among a wired connection through a USB cable, Bluetooth communication, RF communication, WiFi communication, ZigBee communication, and NFC communication.

When the operation processor of the vehicle terminal 100 determines that the portable terminal 200 is physically connected in step S202, the operation processor of the vehicle terminal 100 activates the APP installation confirming module 101 and makes a request for confirming whether the interlocking APP 310 is installed in the portable terminal 200 (S203).

The operation processor of the vehicle terminal 100 receives information about whether the interlocking APP 310 is installed, which is provided from the portable terminal 200 within a set period of time (S204).

The operation processor of the vehicle terminal 100 determines whether it is necessary to delete the interlocking APP 310 installed in the portable terminal 200, an APP, which is installed in the vehicle terminal 100 and affects the driving regulations, a specific APP that needs to be deleted for update, and a specific APP that conflicts with the operation of the vehicle terminal 100, which are installed in the portable terminal 200 (S205).

When the operation processor of the vehicle terminal 100 detects the APP, of which the deletion is necessary, the operation processor of the vehicle terminal 100 activates the interlocking APP deletion inducing module 104, and makes a request for deleting the interlocking APP 310 or the specific APP in the portable terminal 200 (S206).

Accordingly, the interlocking APP 310 installed in the portable terminal 200, the APP which affects the driving regulations, the specific APP that needs to be deleted for update, and the specific APP that conflicts with the operation of the vehicle terminal 100 may be automatically deleted.

Figure 4:
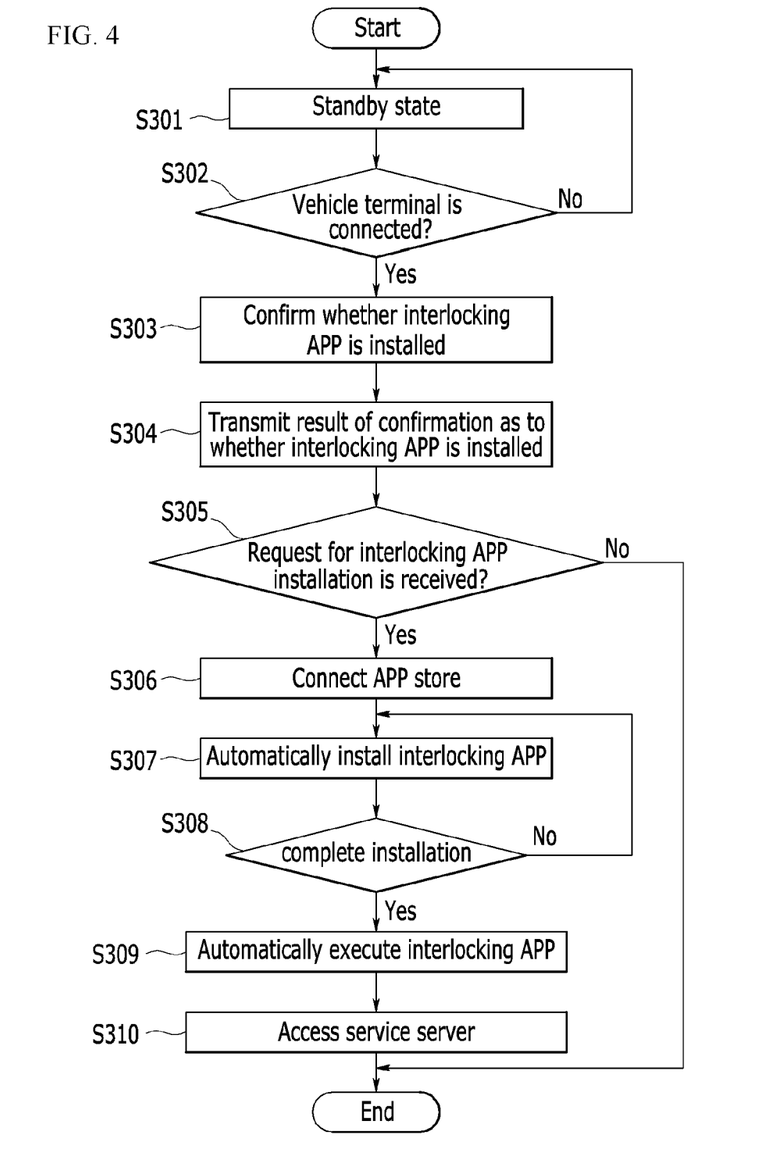
FIG. 4 is a flowchart illustrating an operation procedure of the portable terminal connected with the vehicle terminal according to the first exemplary embodiment of the present disclosure.

FIG. 4 is a flowchart illustrating an operation procedure of the portable terminal connected with the vehicle terminal according to the first exemplary embodiment of the present disclosure.

In a standby state (S301), an operation processor of the portable terminal 200 according to the present disclosure determines whether the vehicle terminal 100 is physically connected for data communication (S302).

The physical connection between the portable terminal 200 and the vehicle terminal 100 may adopt any one communication among a wired connection through a USB cable, Bluetooth communication, RF communication, WiFi communication, ZigBee communication, and NFC communication.

The operation processor of the portable terminal 200 activates the interlocking APP installation determining module 201 and confirms whether the interlocking APP 310 is installed in the OS terminal according to the physical connection of the vehicle terminal 100 in step S302 and a request for confirming whether the interlocking APP 310 is installed, which is received from the vehicle terminal 100 (S303).

When the operation processor of the portable terminal 200 confirms whether the interlocking APP 310 is installed, the operation processor of the portable terminal 200 activates the interlocking APP installation replying module 202, and transmits a result of the confirmation whether the interlocking APP 310 is installed to the vehicle terminal 100 (S304).

The operation processor of the portable terminal 200 determines whether a request for installing the interlocking APP 310 is received from the vehicle terminal 100 (S305).

When the request for installing the interlocking APP 310 is received from the vehicle terminal 100 in step S305, the operation processor of the portable terminal 200 activates the interlocking APP automatic installing module 203.

Accordingly, the interlocking APP automatic installing module 203 activates the APP store connecting module 206 to connect the APP Store or the Android Market (S306), and searches for the interlocking APP 310 corresponding to the vehicle terminal 100 in the APP Store or the Android Market, downloads the interlocking APP 310 in the OS terminal, and automatically installs the downloaded interlocking APP 310 (S307).

The operation processor of the portable terminal 200 determines whether the interlocking APP 310 for the vehicle terminal 100 is completely installed through the interlocking APP automatic installing module 203 (S308), and when the interlocking APP 310 is completely installed, the operation processor of the portable terminal 200 activates the interlocking APP automatic execution inducing module 204 according to the request of the vehicle terminal 100, and automatically executes the interlocking APP 310 installed in the OS terminal (S309).

Accordingly, the portable terminal 200 is connected with the service server installed in the control center according to the execution of the interlocking APP 310, transmits the vehicle data including mileage, self-diagnosis information, driving information, and the like, which are provided from the vehicle terminal 100, to the service server, receives various information and management services provided from the service server and provides the vehicle terminal 100 with the received various information and management services (S310).

Figure 5:
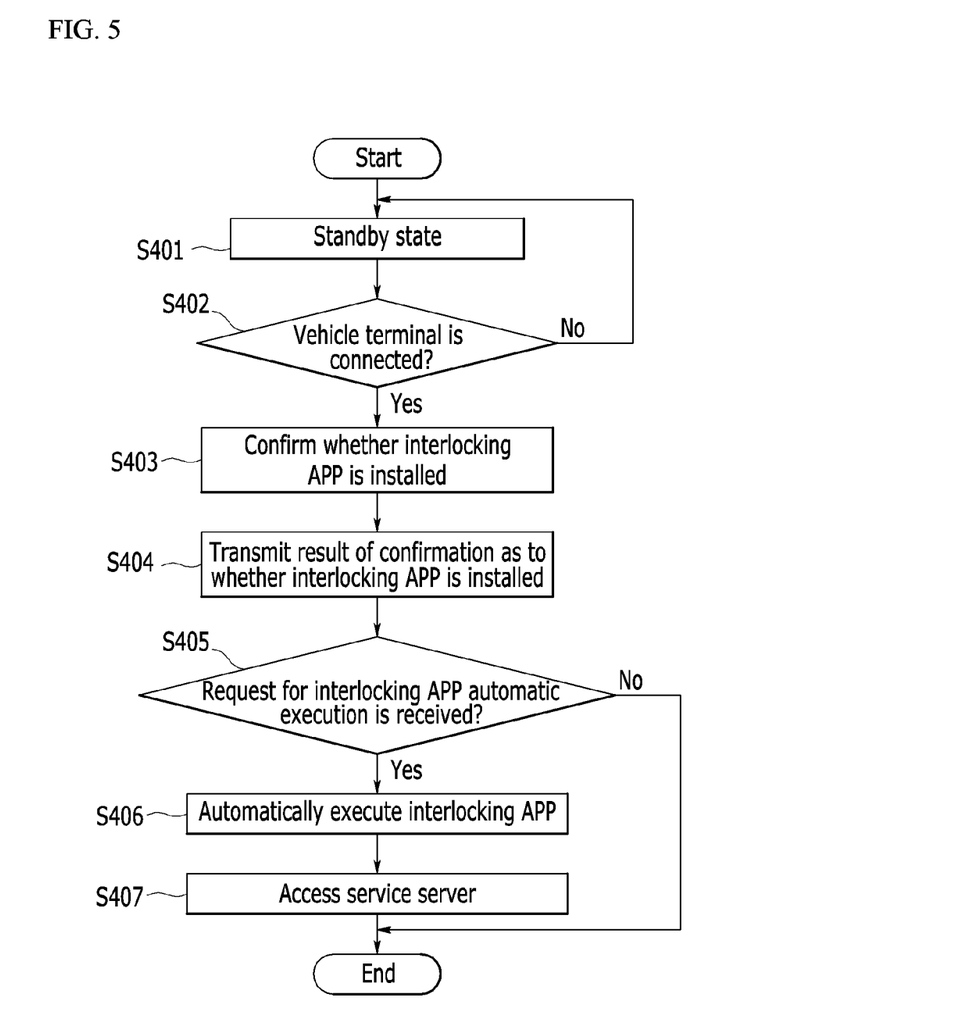
FIG. 5 is a flowchart illustrating an operation procedure of the portable terminal connected with the vehicle terminal according to the second exemplary embodiment of the present disclosure.

FIG. 5 is a flowchart illustrating an operation procedure of the portable terminal connected with the vehicle terminal according to the second exemplary embodiment of the present disclosure.

In a standby state (S401), an operation processor of the portable terminal 200 according to the present disclosure determines whether the vehicle terminal 100 is physically connected for data communication (S402).

The physical connection between the portable terminal 200 and the vehicle terminal 100 may adopt any one communication among a wired connection through a USB cable, Bluetooth communication, RF communication, WiFi communication, ZigBee communication, and NFC communication.

The operation processor of the portable terminal 200 activates the interlocking APP installation determining module 201 and confirms whether the interlocking APP 310 is installed in the OS terminal according to the physical connection of the vehicle terminal 100 in step S402 and a request for confirming whether the interlocking APP 310 is installed, which is received from the vehicle terminal 100 (S403).

When the operation processor of the portable terminal 200 confirms whether the interlocking APP 310 is installed, the operation processor of the portable terminal 200 activates the interlocking APP installation replying module 202, and transmits a result of the confirmation as to whether the interlocking APP 310 is installed to the vehicle terminal 100 (S404).

The operation processor of the portable terminal 200 determines whether a request for automatically executing the interlocking APP 310 is received from the vehicle terminal 100 (S405).

When the request for automatically executing the interlocking APP 310 is received from the vehicle terminal 100 in step S405, the operation processor of the portable terminal 200 activates the interlocking APP automatic execution inducing module 204 and automatically executes the interlocking APP 310 installed in the OS terminal (S406).

Accordingly, the portable terminal 200 is connected with the service server installed in the control center according to the execution of the interlocking APP 310, transmits the vehicle data including mileage, self-diagnosis information, driving information, and the like, which are provided from the vehicle terminal 100, to the service server, receives various information and management services provided from the service server, and provides the vehicle terminal 100 with the received various information and management services (S407).

Figure 6:
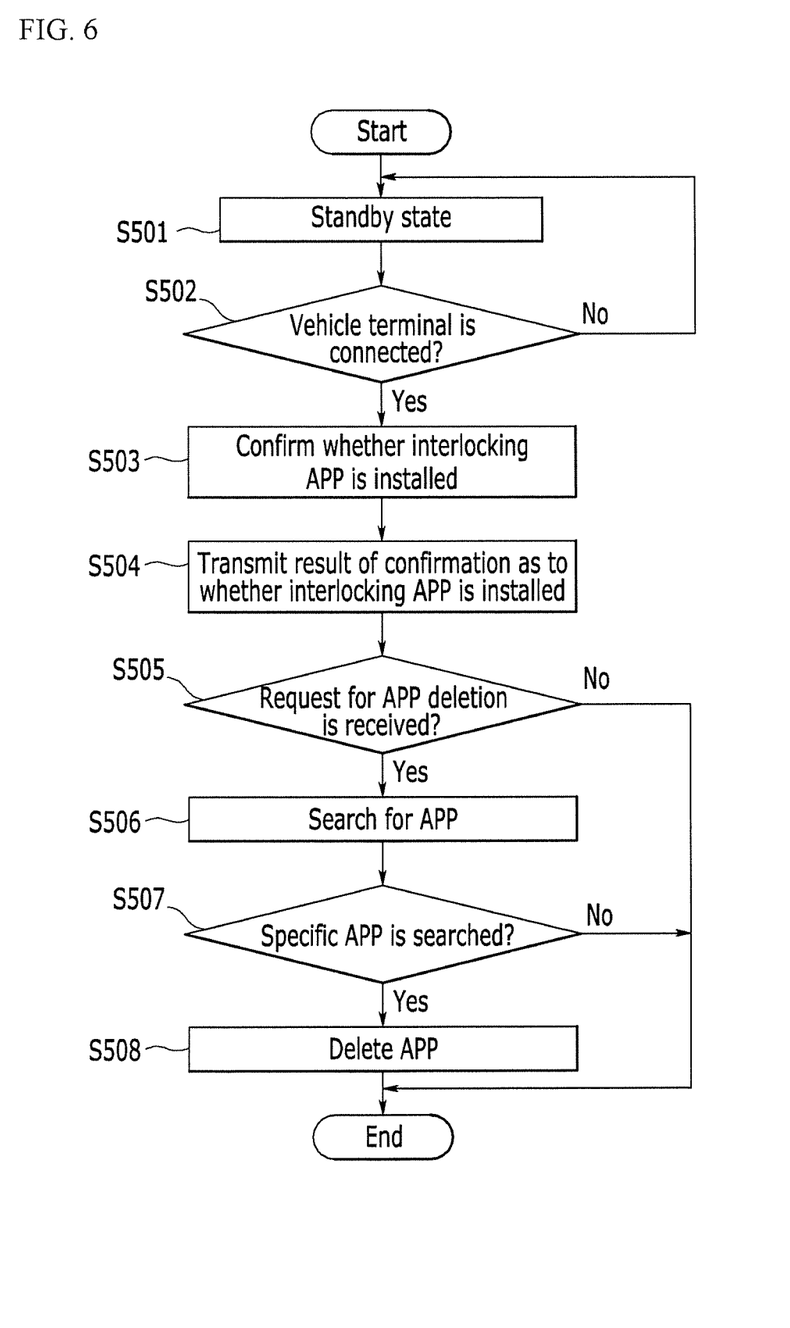
FIG. 6 is a flowchart illustrating an operation procedure of a portable terminal connected with a vehicle terminal according to a third exemplary embodiment of the present disclosure.

FIG. 6 is a flowchart illustrating an operation procedure of a portable terminal connected with a vehicle terminal according to a third exemplary embodiment of the present disclosure.

In a standby state (S501), an operation processor of the portable terminal 200 according to the present disclosure determines whether the vehicle terminal 100 is physically connected for data communication (S502).

The physical connection between the portable terminal 200 and the vehicle terminal 100 may adopt any one communication among a wired connection through a USB cable, Bluetooth communication, RF communication, WiFi communication, ZigBee communication, and NFC communication.

The operation processor of the portable terminal 200 activates the interlocking APP installation determining module 201 and confirms whether the interlocking APP 310 is installed in the OS terminal according to the physical connection of the vehicle terminal 100 in step S502, and a request for confirming whether the interlocking APP 310 is installed, which is received from the vehicle terminal 100 (S503).

When the operation processor of the portable terminal 200 confirms whether the interlocking APP 310 is installed, the operation processor of the portable terminal 200 activates the interlocking APP installation replying module 202, and transmits a result of the confirmation as to whether the interlocking APP 310 is installed to the vehicle terminal 100 (S504).

The operation processor of the portable terminal 200 determines whether a request for deleting the interlocking APP 310 is received from the vehicle terminal 100 (S505).

When the request for deleting the interlocking APP 310 is received from the vehicle terminal 100 in step S505, the operation processor of the portable terminal 200 activates the interlocking APP automatic deleting module 205 and searches for installed APPs (S506), and determines whether the interlocking APP 310 the deletion of which is requested, the specific APP that affects the driving regulations, the specific APP that needs to be deleted for update, and the specific APP causing a collision with the operation of the vehicle terminal 100 are searched (S507).

When the interlocking APP 310 the deletion of which is requested, the specific APP that affects the driving regulations, the specific APP that needs to be deleted for update, and the specific APP causing a collision with the operation of the vehicle terminal 100, are searched, the interlocking APP automatic deleting module 205 of the portable terminal 200 automatically deletes the corresponding APP (S508).

While this disclosure has been described in connection with what is presently considered to be practical exemplary embodiments, it is to be understood that the disclosure is not limited to the disclosed embodiments, but on the contrary, is intended to cover various modifications and equivalent arrangements included within the spirit and scope of the appended claims.

What is claimed is:

1. A system for interlocking a vehicle terminal with a portable terminal, wherein, the vehicle terminal is configured to collect vehicle data including mileage, self-diagnosis information, and driving information according to an operation; and the portable terminal is connected with the vehicle terminal, and connected with a service server of a control center through wireless communication, and is configured to transmit the vehicle data provided from the vehicle terminal to the service server, receive information and a management service provided from the service server, and provide the information and the management service to the vehicle terminal, wherein the vehicle terminal includes:

an APP installation confirming module configured to confirm whether an interlocking APP interlockable with the vehicle terminal is installed in the portable terminal;

an interlocking APP installation inducing module configured to make a request for automatically installing the interlocking APP in the portable terminal when the interlocking APP is not installed in the portable terminal as a result of the confirmation of the APP installation confirming module;

an interlocking APP execution inducing module configured to make a request for automatically executing the interlocking APP in the portable terminal when the interlocking APP is installed in the portable terminal as the result of the confirmation of the APP installation confirming module; and an interlocking APP deletion inducing module configured to make a request for automatically deleting the interlocking APP and a reference APP, which are installed in the portable terminal, wherein the portable terminal includes:

a display module configured to output an installation progress state of the interlocking APP, and an execution screen image of the interlocking APP; and a display configured to display the installation progress state and the execution screen image.

2. The system of claim 1, wherein:

the connection between the vehicle terminal and the portable terminal adopts any one among communication through a USB cable, Bluetooth communication, RF communication, WiFi communication, ZigBee communication, and NFC communication.

3. The system of claim 1, wherein:

the APP installation confirming module transmits a request signal for confirming whether the interlocking APP is installed in the portable terminal, and confirms whether the interlocking APP is installed from a signal replied from the portable terminal.

4. The system of claim 1, wherein:

the interlocking APP deletion inducing module makes a request for automatically deleting an APP that affects driving regulations, a to-be-deleted APP that needs to be deleted for update, and a conflicting APP that conflicts with the interlocking with the vehicle terminal, which are installed in the portable terminal.

5. The system of claim 1, wherein the portable terminal includes:

an interlocking APP installation determining module configured to confirm whether the interlocking APP is installed in an OS terminal according to a request of the vehicle terminal;

an interlocking APP installation replying module configured to transmit information about whether the interlocking APP is installed, which is confirmed by the interlocking APP installation determining module, to the vehicle terminal;

an interlocking APP automatic installing module configured to search for and automatically install the interlocking APP corresponding to the vehicle terminal by interlocking with an APP store connecting module according to an interlocking APP installation request of the vehicle terminal;

an interlocking APP automatic execution inducing module configured to automatically execute an interlocking APP according to an interlocking APP execution request of the vehicle terminal;

an interlocking APP automatic deleting module configured to automatically delete the installed APP according to an interlocking APP deletion request of the vehicle terminal;

and an interlocking APP downloaded from the APP Store or the Android Market and installed, and configured to provide interlocking and data communication with the vehicle terminal, wherein the APP store connecting module is configured to interlock with the interlocking APP automatic installing module, automatically access the APP Store or the Android Market, and search for and install the interlocking APP.

6. The system of claim 5, wherein:

the interlocking APP deleting module automatically deletes an APP that affects driving regulations, a to-be-deleted APP that needs to be deleted for update, and a conflicting APP that conflicts with the interlocking with the vehicle terminal.

7. A method of interlocking a vehicle terminal with a portable terminal, the method comprising steps of:

activating, by an operation processor of the vehicle terminal, an APP installation confirming module when a connection of the portable terminal is detected, and making a request for confirming whether an interlocking APP is installed in the portable terminal;

activating, by the operation processor of the portable terminal, an interlocking APP installation determining module according to a request of the confirmation from the vehicle terminal, confirming whether the interlocking APP is installed in an OS terminal, activating an interlocking APP installation replying module, and transmitting a result of the confirmation as to whether the interlocking APP is installed, to the vehicle terminal;

activating, by the operation processor of the vehicle terminal, an interlocking APP installation inducing module when the interlocking APP is not installed in the portable terminal, and making a request for automatically installing the interlocking APP in the portable terminal;

activating, by the operation processor of the portable terminal, an interlocking APP automatic installing module and an APP store connecting module according to a request of the vehicle terminal, searching for the interlocking APP corresponding to the vehicle terminal in the APP Store or the Android Market, and automatically installing the searched interlocking APP; and activating, by the operation processor of the vehicle terminal, an interlocking APP execution inducing module when the interlocking APP is installed in the portable terminal, and making a request for automatically installing the interlocking APP in the portable terminal;

activating, by the operation processor of the portable terminal, an interlocking APP automatic execution inducing module according to a request of the vehicle terminal, automatically executing the interlocking APP, accessing a service server through the interlocking APP, and providing data communication; and display, by a display of the portable terminal, an installation progress state of the interlocking APP and an execution screen image of the interlocking APP.

8. The method of claim 7, further comprising steps of:

activating, by the operation processor of the vehicle terminal, an interlocking APP deletion inducing module when the portable terminal is connected, and making a request for deleting the APP in the portable terminal; and activating, by the operation processor of the portable terminal, the interlocking APP automatic deleting module according to a request of the vehicle terminal, and automatically deleting a designated interlocking APP, an APP that affects the driving regulations, a to-be-deleted APP that needs to be deleted for update, and a conflicting APP that conflicts with the interlocking with the vehicle terminal.

* * * * *